United States Patent [19]

Dustin

[11] 3,779,761

[45] Dec. 18, 1973

[54] PRESENSITIZED LIGHT-SENSITIVE LETTERPRESS PRINTING MAKEREADY

[75] Inventor: Daniel S. Dustin, Minneapolis, Minn.

[73] Assignee: Minnesota Mining and Manufacturing Company, St. Paul, Minn.

[22] Filed: Sept. 28, 1972

[21] Appl. No.: 292,863

Related U.S. Application Data

[63] Continuation-in-part of Ser. No. 218,238, Jan. 17, 1972, Pat. No. 3,703,362.

[52] U.S. Cl. ............... 96/38.2, 101/401.3, 250/316, 250/317, 96/75, 96/115 P

[51] Int. Cl. ......................... G03c 5/00, G03c 11/00

[58] Field of Search ......................... 96/38.2, 67, 75, 96/115 P; 101/401 B; 250/316, 317

[56] References Cited

UNITED STATES PATENTS

| | | | |
|---|---|---|---|
| 2,825,282 | 3/1958 | Gergen et al. | 101/401.3 |
| 3,060,023 | 10/1962 | Burg et al. | 96/115 P |
| 3,298,833 | 1/1967 | Gaynor | 96/75 |
| 3,703,362 | 11/1972 | Dustin | 96/38.2 |

*Primary Examiner*—David Klein
*Attorney*—Alexander, Sell, Steldt & Delahunt

[57] ABSTRACT

Novel presensitized light-sensitive makeready sheet material for letterpress printing is provided. This sheet material is comprised of a flexible backing overlaid in ascending order with a thermoexpansible layer and a pigmented light-sensitive system. The system can include negative-acting or positive acting light-sensitive materials.

8 Claims, 4 Drawing Figures

PATENTED DEC 18 1973 3,779,761

PRESENSITIZED LIGHT-SENSITIVE LETTERPRESS PRINTING MAKEREADY

This application is a continuation-in-part of Ser. No. 218,238, filed Jan. 17, 1972, now U.S. Pat. No. 3,703,362, bearing the same title and assigned to the same assignee.

FIELD OF THE INVENTION

This invention relates to the art of makeready for letterpress printing, especially as related to letterpress printing where photopolymer relief printing plates are utilized.

BACKGROUND OF THE INVENTION

In letterpress printing, an impression cylinder is commonly used to press a sheet, usually paper, against the inked face of a printing plate. The ink on the face or image of the printing plate, i.e., on the surface of raised printing elements, is thereby printed upon the sheet.

For highest quality letterpress printing, certain preliminary steps are required in readying the printing apparatus for operation. Makeready is a part of this preliminary procedure and, as used herein, involves selectively adjusting the impression pressure under which areas of the face of the printing plate and the impression cylinder meet or coact during printing. This selective adjustment of impression pressure affords prints which have dense solids, uniform, clean line copy, and in picture areas, a full range of half tones, from deep shadow areas to clean highlights, such as are desirable in encyclopedias, art magazines, and the like.

This adjustment of impression pressure can be accomplished by varying the thickness of packing on selected areas of the impression cylinder, commonly termed "overlay" makeready. Alternatively, or in conjunction with overlay makeready, pressure corrective material can be inserted beneath the mounting block on which a printing plate rests, termed "underlay" makeready, and/or between the printing plate and the mounting block, termed "interlay" makeready.

In this manner, impression pressure in solid tone printing areas is increased with respect to that in middle tone printing areas, the highlight or nonprinting areas receive the least pressure.

Consistent with conventional terminology, solid tone printing areas have a high tonal density, i.e., a high percentage of ink is contained per unit of surface area. Middle tone printing areas have a correspondingly lower tonal density, i.e., a lower percentage of ink is contained per unit of surface area. Nonprinting or highlight areas would of necessary have the least tonal density.

A novel makeready sheet material was the subject of Gergen & Wartman, U.S. Pat. No. 2,825,282, granted Mar. 4, 1958. This patent utilizes the selective expansion of a thermoexpansible layer of sheet material which is resistant to compression when expanded. In general, this sheet material is inked or printed with the general likeness of a printing plate and exposed to high-intensity radiant energy. Because the inked image area is absorptive of this radiant energy, a selective differential sustained expansion occurs. Upon cooling, the expanded material becomes hard and resistant to the compression pressures expected during the printing operation. The expanded sheet material is then placed in registration with the printing plate such that the greatest expansion areas coact with the solid tone areas of the printing plate, i.e., the thickness relief of the expanded sheet corresponds to the tone of the printing plate.

Since the advant of this makeready sheet material, printing plates or forms utilizing photopolymerization have been introduced in the printing field. Such plates are exposed through photographic negatives or transparencies of the desired printed matter and developed, such that the image is retained on the form and nonimage areas are removed, thus providing a suitable relief printing plate.

Use of the makeready sheet material of the Gergen and Wartman patent with photopolymer relief printing plates requires the inking of the imaged and developed printing plate, the transfer of the inked image to the makeready sheet material, followed by selective expansion in the inked areas. Registration of the makeready material must be by some mechanical means, such as a mark or slit on the impression cylinder, to provide the exacting registration needed for high quality printing. In addition, overlay makeready, wherein the selective adjustment of impression pressure occurs through variation in thickness of impression cylinder packing, would normally be required since the image inked on the makeready sheet would be reverse reading from that of the printing plate.

The invention of my parent application, Ser. No. 218,238, utilized the basic principles of the Gergen and Wartman makeready sheet material, i.e., selective differential expansion of a thermoexpansible layer in image areas, and improved upon it by providing makeready sheet material which was light-sensitive. Light sensitivity was obtained by utilization of a diazo resin layer, and an outer layer of a pigmented, water-insoluble, solvent softenable polymer and included to provide an image area capable of absorbing high intensity radiant energy. This allowed the makeready material to be formed utilizing the same photographic negative or transparency used to image a photopolymer relief printing plate, without forming the photopolymer plate, registering the plate on a printing press, inking the plate, and transferring the inked image to the mounted makeready sheet. Thus, the makeready sheet could be developed and èxpanded independent of the printing plate preparation. Additionally, since the photographic negative or transparency used in the process normally contains registry marks for registration of the completed photopolymer printing plate, these same registry marks could be utilized in the makeready sheet, thereby greatly reducing registration time.

This invention provides a second improvement over the basic Gergen and Wartman makeready sheet material, namely by including conventional negative-acting and positive-acting light-sensitive materials which can be applied in an integral layer with a pigmented film-forming binder polymer.

SUMMARY OF THE INVENTION

In accordance with the invention, there is provided a presensitized light-sensitive makeready sheet material comprising a flexible backing or carrier web on which there is overlaid: a selectively thermoexpansible layer comprising an at least temporarily thermosoftenable resin and uniformly distributed therethrough a heat-sensitive puffing agent capable of expanding this layer at least two mils in thickness when heat activated, and a light-sensitive system comprising a light-sensitive material in a pigmented film forming binder, the light-sensitive material having one solubility state in relation to a developing media before exposure to light and another solubility state in relation to the developing media after light exposure, such that the light-sensitive material is soluble in one of its states and insoluble in its other state.

This makeready sheet material can be exposed to the same photographic negative or transparency used to expose the photopolymer relief printing plate, developed to reveal a pigmented image area absorptive of high-intensity radiant energy, and then expanded according to the methods taught by the Gergen and Wartman patent. This affords a makeready sheet material which can be processed independent of the photopolymer printing plate and does not have to be press mounted, as for ordinary proofing, etc., until final registration with the photopolymer printing plate, yet will provide the proper differential of impression pressure to yield high quality letterpress printing. Areas of the image-developed makeready sheet material containing a high tonal density or high percentage of pigment per unit surface area, i.e., solid or shadow tone areas, absorb a greater amount of radiant energy and thus cause a greater amount of gas formation by the puffing agent than do areas where this percentage is small, i.e., middle tone areas. Nonimage areas contain no pigment or at least only to an insignificant extent and so do not expand, at least relative to the solid or middle tone areas.

The resulting sheet after light exposure, development, and high-intensity radiation exposure has a relief thickness corresponding to the tone of the photopolymer printing plate, i.e., thickest in solid tone area (and of greates thickness in the center of such areas), thinnest in nonprinting areas, and of essentially graduated thickness between these extremes.

To illustrate but not limit the invention, a number of drawings are set forth herein:

It should be noted that the drawings are illustrative only, and it is not intended that the various layers and components of the novel makeready sheet material be represented in their true dimensions or proportions.

Figures 1, 2, 3:
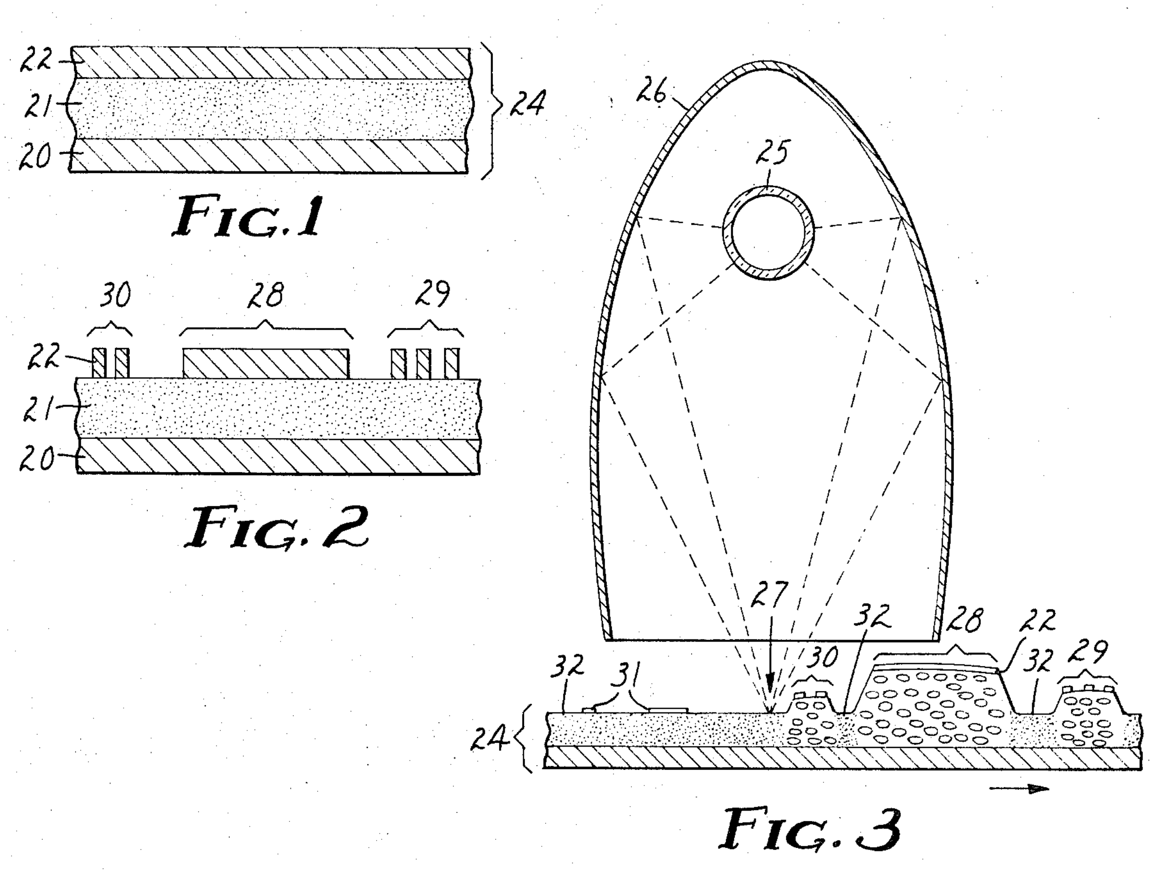
FIG. 1 is a diagrammatic section through a makeready sheet of this invention.
FIG. 2 is a diagrammatic section of the makeready sheet of this invention after image exposure and development.
FIG. 3 is a diagrammatic section of a source of high-intensity radiant energy and a makeready sheet selectively expanded in part.

According to the preferred embodiment of my invention, designated for brevity as interlay makeready, a sheet such as illustrated in FIG. 1 and 24 comprising a carrier web or backing 20, a thermoexpansible layer 21, and a light-sensitive layer 22 is first exposed to the same photographic negative or transparency to be used to produce the printing plate utilizing standard photographic exposure techniques. This exposure to actinic radiation followed by selective development yields the sheet material of FIG. 2 wherein the areas 28, 29, and 30 constitute the printing image areas.

Image area 28 is designated as a solid area, indicating a high tonal density, e.g., about 100 percent pigment is contained per unit surface area. Image areas 29 and 30 are to be considered middle tone areas of somewhat less percentage pigment per unit surface area. Additionally, area 29 is illustrated to have a higher degree of tonal density than area 30. For example, area 29 could have 75 percent pigment per unit surface area while area 30 could contain 60 percent pigment per unit surface area.

After development of the image, the makeready sheet is briefly exposed to uniform and intense radiant energy as is illustrated by FIG. 3. In this figure, sheet material 24 with image areas 28, 29 and 30 facing toward high intensity radiation source 25 in elliptical reflector 26 is moved toward the right as indicated by the arrow, through the narrow focused band 27 of radiant energy. In those areas to the right of 27, the sheet is illustrated as being selectively expanded according to the pigmented imaged pattern thereon. Solid tone image area 18 is greatly expanded, while middle tone areas 29 and 30, of proportionately less tonal density, are expanded only to a degree commensurate with their tone. Nonimage areas 32 are unexpanded. Unexpanded image areas 31 to the left of the focused band or line 27 have not yet been exposed to the intense radiant energy.

In this high-intensity radiation exposure step, the pigmented image areas on the makeready sheet absorb infrared or equivalent radiant energy and become heated, which in turn heats areas of the layer of thermosoftenable resinous material and puffing agent adjacent thereto by conduction. These areas soften, the puffing agent in the layer is activated in the soft areas under these conditions of heat, and the gas released by the puffing agent produces bubbles in the softened areas causing them to swell. Upon cooling, the expanded areas become hard and the generated gas remains entrapped in the expanded areas of the layer.

Figure 4:
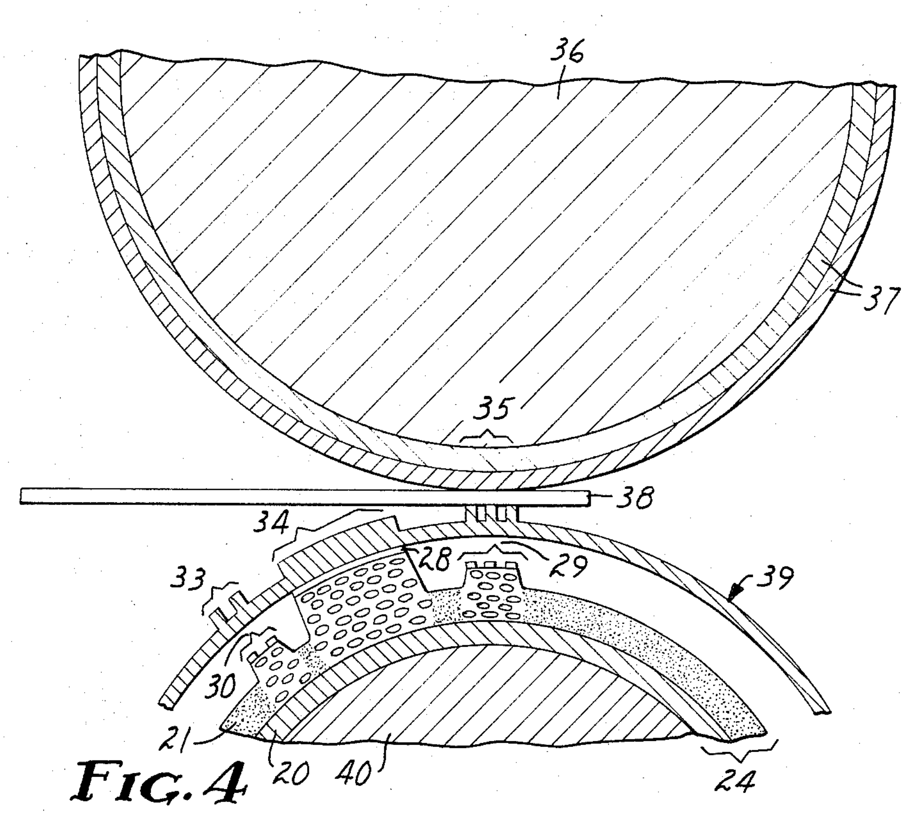
FIG. 4 is a diagrammatic section of a printing plate having a selectively expanded makeready sheet in registered interlay position therewith and an impression cylinder.

In FIG. 4, an expanded makeready sheet 24 is illustrated in registered position beneath printing plate 39. Both are mounted on a suitable plate roller support 40. Selectively expanded areas 28, 29 and 30 of sheet 24 coact with solid tone area 34 and middle tone areas 33 and 35, respectively of printing form 39. A paper sheet 38 is shown receiving the inked image of printing form 39 by action of an impression cylinder 36 with packing layers 37 against the printing form.

DETAILED DESCRIPTION OF THE INVENTION

The flexible backing or carrier web is ideally between about 2 and 5 mils thick and should be dimensionally stable, i.e., resistant to curling, warping, stretching, etc., when overlaid with the thermoexpansible, light-sensitive, and pigmented layers. Preferably, the surface of the backing material to be overlaid should be of sufficient fibrous nature to assure that the thermoexpansible layer will be adequately anchored thereto. However, if a smooth surfaced backing is utilized, it may be roughened to secure the bonding thereto or a layer of adhesive may be deposited on the surface to effect bonding.

Preferred backing members are those characterized by low thermal conductivity, particularly when compared to the conductivity of metals, so that lateral diffusion of heat through the backing from adjacent portions of the bonded thermoexpansible layer during processing is minimized. Preferred backings are also light in color, since dark backings may be absorptive of the high intensity radiant energy encountered during processing.

In addition to the bleached kraft paper utilized in the illustrative examples, generally those backings disclosed in the Gergen and Wartman patent are suitable. These include the nonfibrous films of glycolterephthalate polymer, commercially known as "Mylar," cellulose acetate, silk screens, various laminates of materials, impregnated materials, etc.

The resinous materials and puffing agents disclosed by Gergen and Wartman to be useful in the thermoexpansible layer of their makeready sheet material are generally also useful in my invention.

The resinous material must be thermosoftenable but should possess sufficient toughness, hardness, and resilient strength after processing of the makeready sheet to adequately resist compression from pressures encountered during letterpress printing operation.

These pressures are believed to approximate 50 psi for a period of about 15 seconds and a fully processed makeready sheet should be capable of maintaining at least a two mil difference in thickness between fully expanded and unexpanded areas under these operating conditions. Preferably, the thermoexpansible layer has a uniform, smooth, fused appearance prior to expansion.

Suitable resinous materials are usually polymeric, and preferably at least one hard thermoplastic polymeric material, i.e., having a Shore D Durometer hardness above about 40, is employed in the layer. However, softer materials which are temporarily thermoplastic but thermosetting or curable to suitable hardness in processing are also suitable either separately or in combination with a hard thermoplastic polymeric material.

The dispersed heat-sensitive puffing agent in the thermoexpansible layer should remain dispersed and stable at normal room temperature, i.e., 25°C. The puffing agent may react with or cure the thermosoftenable resinuous material during processing or may even be a molecular component of the resinuous material as long as the required ability to expand the layer under processing conditions hereinafter described is retained.

Preferred puffing agents chemically decompose at elevated temperatures to yield a gas. However, puffing agents which vaporize upon heating, while inferior, can be suitable to use.

Finely pulverized, uniformly dispersed particles of a puffing agent facilitate the formation of a large number of tiny bubbles or cavities in the resinous layer with a great number of connecting columns of resin, all of which contributes to the strength and resiliency of expanded areas, as well as to the formation of well-regulated graduated relief patterns.

The amount of puffing agent employed may vary depending upon the relative ability of the agent to expand the sheet under the conditions employed in processing. A resinous layer may contain as little as approximately 1 percent by weight of a highly efficient puffing agent, e.g., "Calogen AZ," but may require up to approximatley 30 percent by weight of a less efficient agent. Amounts in excess of approximately 10 percent by weight are generally to be avoided inasmuch as certain weaknesses are apt to develop within the sheet. However, an inefficient puffing agent which contributes to the strength of the sheet may be suitable to employ in high concentrations.

The temperature at which the resinous material softens and the temperature at which a puffing agent incorporated therein is activated should generally be within approximately the range of 75°F. of each other, although for some less critical combinations a temperature difference as great as about 150°F., or even greater, has been found useful. Generally, however, it has been found that if a puffing agent is activated at a temperature too far below that at which a resinous layer softens, control of expansion becomes difficult and desired graduated relief patterns are not easily obtained. If, on the other hand, the puffing agent is activated only at temperatures greatly above those at which the resinous material softens, difficulty arises with respect to retaining the released gas or other activating agent within the softened resinous layer. The faults of extremes are easily avoided if materials are selected with a view toward maintaining the activation temperatures for the puffing agent reasonably close to the softening temperature of the resinous layer.

While solution or dispersion coating methods are adequate for application of the thermoexpansible layer to the backing, any method which will provide an essentially uniform film over the entire backing member is suitable, e.g., calendering, extruding, etc. The dry thickness of this layer is preferably between approximately two and seven mils, but may be as great as twelve mils in thickness are generally undesirable because expanded areas may be compressible and expanded thickness differentials may be reduced. However, these disadvantages of a thick film may be corrected to some extent by incorporating suitable curing agents and/or thermosetting resins. A thickness of at least two mils is needed for the formation of proper relief patterns. Thinner coats fail to expand reliably and may even lose gas generated therein.

The applied thermoexpansible layer should preferably be dried to less than about 3 percent volatile solvent by weight so as to avoid unnecessary weaknesses in the layer upon expansion. Some minor amount of solvent can be advantageous, however, as serving to plasticize the resinous material to impart some planar stability to the sheet material, i.e., reduction of tendency to curl and warp.

When thermoplastic resins are utilized in the thermoexpansible layer, small amounts of organic, usually polymeric, plasticizers can also be advantageous to obtain planar stability. Such plasticizers, however, almost invariably reduce the strength of the expanded resinous layer. Accordingly, the thermoexpansible layer in such embodiments is generally at least about 3 mils thick, and preferably between 4 and 7 mils thick. This range affords the best resuls in terms of maintaining proper expanded thickness differentials under the conditions or printing press operation.

Corona priming or treating of the sheet material prior to application of the light-sensitive system advantageously promotes wetability of the light-sensitive application solution and adhesion of the insoluble material to the thermoexpansible underlayer after imagewise exposure. Treatments of this nature are generally conventional procedures prior to overcoating of plastic surfaces.

Light sensitive materials suitable for use in this invention include conventional monomers which polymerize or cross-link in the presence of photoinitiators which form free radicals upon exposure to actinic light. Illustrative materials include those described in U. S. Pat. Nos. 3,469,982; 3,448,089; 3,376,138; 1,973,493; 2,948,610; Belgian Pat. No. 675,490; and copending and commonly assigned U.S. Pat. application, Ser. No. 209,137, filed by Bonham on Dec. 17, 1971, incorporated herein by reference. In the case where a positive-acting light-sensitive system is desired, i.e. where light-exposed areas become more soluble than unexposed areas, exemplary materials are diazo quinone compositions described e.g., in U. S. Pat. Nos. 3,046,112; 3,046,118; 3,046,119; 3,046,121; 3,046,124; and 3,661,573. Other suitable positive-acting light-sensitive compositions are described in copending and commonly assigned U. S. Pat. application by Smith et al., Ser. No. 224,918, filed Feb. 9, 1972, incorporated herein by reference.

Conventional diazo resins which insolubilize in areas exposed to actinic radiation as discosed in my parent application, Ser. No. 218,238, are differentiated from the light-sensitive materials heretofore disclosed in that a separate layer construction is required for the diazo resin and pigmented resin portions of the makeready sheet. This separate layer construction is required because of incompatibility in application solvent selection between the diazo and binder resins.

Solution coating is a desirable method for application of the light-sensitive system uniformly over the thermoexpansible layer of the makeready sheet material. However, material such as the aforementioned photopolymerizable monomers are generally not film formers. Therefore, film-forming polymer resins must be included in applications solutions to provide a suitable film as well as to provide a binder for the pigment dispersed in the film.

Suitable film-forming organic resin compositions which are compatible with conventional light-sensitive materials include various vinyl polymers, such as polyvinylbutyrol, polymethylmethacrylate, polystyrene, polyvinyl acetate, polyethylene, polyvinylformal; condensation polymers such as polyester resins, e.g. aklyd resins, polyamide resins, phenolaldehyde resins, urea-aldehyde resins; other polymers such as cellulose acetate butyrate, polyalkylene-polysulfide resins, etc. In addition, compatible mixtures of the above-mentioned materials and other similar and equivalent resins can be used so long as they are compatible with the particular light-sensitive material used therewith.

Application solution solvents must be chosen so as not to exert a strong solvent action on the underlying thermoexpansible layer. In general, lower aliphatic alcohols containing up to about seven carbon atoms are suitable solvents in terms of their action on the underlying thermoexpansible layer, whereas aromatic hydrocarbons, esters, ketones, and chlorinated hydrocarbons are not suitable. Since a broad range of thermosoftenable resins are useful in that layer, a minor amount of experimentation may be necessary to determine suitability of a particular solvent. One must begin with suitable solvents for the chosen film-forming polymer and light-sensitive material and determine which of these will not aggessively attack the thermoexpansible underlayer.

Solution concentration of light-sensitive material can generally be in the range of 1 to 20 percent by weight, with concentration of binder resin of from 2 to 10 weight percent being adequate for application to the thermoexpansible layer.

The pigment utilized in the invention must provide high-intensity radiation adsorptive image areas, and for this reason black or dark pigments, e.g. carbon black, are preferred. Pigment particle sizes of about five microns are preferred, thus some treatment of the pigment-resin dispersion, e.g. sand or ball milling, is generally required. Particle sizes greater than about ten microns may cause streaking or particle build-up during application, leading to non-uniformity.

Generally, the pigment concentration should be in the range of 80:20 to 55:45 parts by weight of resin binder to pigment, with 70:30 to 65:35 being preferred. Higher pigment concentrations tend to provide a structurally weak or brittle film or layer i.e., it can be scratched, marred or cracked. Additionally, higher concentrations increase the opacity of the layer such that transmission of actinic light during image exposure becomes more difficult and undesirably long exposure time may be necessary. Too low pigment concentration requires an increasingly thicker layer to provide adequate radiation absorption during expansion of the developed image.

Since adequate absorptivity of high intensity radiation is a requisite criteria for the pigmented layer, coating weights are generally couched more desirably in terms of optical density. Utilizing a Welsch Densichron with a Kodak Wratten R-25 Gelatin filter and the uncoated backing support as a reference or zero point, optical densities should generally be in the preferred range of 0.90 to 1.30 Optical densities of less than 0.90 will generally not provide the selective absorption differential required to expand the makeready sheet uniformly and to the desired thickness after image development. Optical densities of greater than 1.30 tend to increase exposure time because of inadequate penetration of actinic light. As a comparison, standard printer's ink has a comparable optical density in the range of 1.10 to 1.20.

The applied solvent-softenable pigmented resinous light-sensitive layer should preferably be dried to about 3 percent residual solvent. Image adhesion to the thermoexpansible underlayer may be inadequate if the pigmented layer is too high in residual solvent. Generally, drying of the sheet material for up to about five minutes at about 180° to 200°F. will provide a sufficient degree of dryness in the pigmented layer.

In the processing of the novel makeready sheet material, conventional photographic techniques are acceptable for light exposure of the sheet material to the photographic negative.

Upon image exposure, the image must be properly developed. Solutions used to imagewise develop the light-exposed makeready sheet material should have certain characteristics. Preferably, the solution should exert a slight but not vigorous solvent or swelling action on the pigmented binder composition. Additionally, it should be an active solvent for the soluble light-sensitive material but have little or no effect on the insoluble light-sensitive material or the thermoexpansible underlayer. Ordinarily, a mixture of two or more preferably miscible liquids is necessary to provide a developing solution having these desirable characteristics. An operable developing solution can be found for any combination of thermoexpansible layer and light-sensitive system employed, although some amount of experimentation may be required. Generally, a suitable developing solution can be obtained by combining a solvent which exerts at least a partial solvent or swelling action on the pigmented resinous binder with a second solvent, miscible with the first, which is not a solvent for the pigmented resinous binder, one of the two being a solvent for the souble light-sensitive composition. Neither of the two solvents, nor the mixture thereof should be a solvent for the insoluble light-sensitive composition. If the first solvent aggressively attacks the pigmented resinous binder, it should be diluted with a second component, such that the solvent action of the mixture is not vigorous.

After image development, the makeready sheet material is comparable to the inked makeready sheet material of the Gergen and Wartmen patent. Consequently, the equipment and conditons for image expansion utilized in Gergen and Wartman are equally applicable for the makeready sheet material of my invention.

The prefered temperature range of which expansion of the heat-sensitive thermoexpansible layer occurs is well above room temperature and is between approximately 150° and 350°F., but may be as high as 450°F. or even considerably higher. Expansion at exceedingly low temperatures is generally unreliable and uncontrollable. Conversely, expansion at temperatures above about 450°F. or 500°F. creates problems with respect to suitable exposure conditions for processing as well as with respect to obtaining suitable graduated relief patterns.

Having described my invention in a general manner, the same is illustrated by the following nonlimiting examples, wherein all parts are by weight unless otherwise specified.

EXAMPLE 1

A solution is first prepared for the thermoexpansible layer by mixing the following:

50 parts — VXDV, a tradename for a dispersion grade vinyl chloride-vinyl acetate copolymer, available from the Union Carbide Co.

50 parts — Pliovic AO-2, a tradename for a vinyl terpolymer available from the Goodyear Chemical Co.

30 parts — EPON 828, a tradename for an epoxy condensation polymer of epichlorohydrin and bisphenol A, available from the Shell Chemical Co.

2 parts — Diphthalyl dihydrazide, a curing agent for the epoxy resin.

5 parts — Celogen AZ, a tradename for azodicarbonamide, available from the U.S. Rubber Co.

53.5 parts — Primary amyl acetate 28.1 parts — Naphtha

The VXDV and the Pliovic AO-2 have fusion temperatures of about 300° F. The diphthalyl dihydrazide is a highly effective curing agent for epoxy resins at the temperatures utilized during expansion. The Celogen AZ puffing agent releases nitrogen gas on decomposition, starting at about 285°F.

This mixture is coated onto a 44 pound bleached Kraft machine calendered paper at a 12 mil orifice setting and dried for 3 minutes at room temperature followed by 3 minutes at 180°F.

The layer is then fused for 5 minutes at about 265°F., leaving a residual solvent of 2–3 percent by weight in the layer.

This coated sheet material is then corona treated at a web speed of 50 feet per minute, utilizing a 70 volt, 9–10 ampere input with a 3/16 inch gap.

A solution (*a*) of photopolymerizable monomers is prepared by dissolving 15 parts — trimethylol propane trimethacrylate 5 parts — trimethacrylate of trishydroxyethyl isocyanurate in 100 parts — methyl butynol In addition, a solution (*b*) of a photoinitiator is prepared by dissolving 1.2 parts — bis 2,4 trichloromethyl-6-4 methoxy styryl-s-triazine in 50 parts — methyl cellosolve A pigmented film-forming binder solution (*c*) is prepared as follows:

3 parts — Formvar 15/95E, tradename for a polyvinylformal resin available from the Monsanto Chemical Co.

100 parts — methyl butynol

To solution (*c*) is added sufficient carbon black (Regal 300, available from the Cabot Co.) to provide a 7:3 weight ratio of resin to pigment. The dispersion is padded through a sand mill until maximum particle size is about 10 microns.

To the combined solutions (*a*) and (*b*) is added 50 parts of the pigment dispersion. The mixture is agitated until a uniform dispersion is obtained.

The dispersion is knife-coated onto the corona-treated thermoexpansible layer at a 3 mil orifice setting and dried for 5 minutes at 180°F.

The optical density of the resultant sheet is measured with a Welsch Densichron equipped with a Kodak Wratten R-25 Gelatin filter utilizing uncoated backing as the reference point. The density is 1.10.

The makeready sheet material is then exposed through a photographic negative of the desired printed matter to a carbon arc (Grafarc Type 33500-24) for 3 minutes at a distance of 36 in.

The light-exposed sheet is placed on a smooth surface and a small amount of 1:1 by volume solution of normal propanol and water is spread over the entire sheet. The sheet is wiped in a circular motion with soft cotton or a conventional lithographic plate developing pad, whereupon the unexposed portions of the layer are removed. The sheet is then wiped dry.

This image-developed sheet is exposed to high-intensity radiation in a commercially available Model MR-2 Makeready Machine, available from the Minnesota Mining and Manufacturing Company. This machine has 3000 watt radiant energy source at a power input of 480 volts. At a focused band width of approximately 3/16 inch, the sheet material is passed once through the machine at a speed setting of 7.0 (corresponding to about 32 inches per minute).

In solid tone image areas the sheet material is expanded to a total thickness of 11.5 mils, 4.5 mils above unexpanded areas. Other areas are expanded commensurate with their tone. For example, in an area of 50 percent printing elements (50 percent being nonprinting) expansion is to about 9.5 mils, 2.5 mils above the unexpanded areas. The fully processed sheet thus presents a thickness relief corresponding to the tone of the printing plate.

EXAMPLE 2

A pigmented film-forming binder dispersion is prepared as follows:

10 parts – Alnovol 429K (tradename for a phenolaldehyde novolak resin available from the American Hoechst Co.)

90 parts — methyl cellosolve 4.3 parts – Regal 300 (tradename for a carbon black available from the Cabot Co.)

This dispersion, containing a 70:30 weight ratio of resin to pigment, is passed through a sand mill until maximum particle size is about 100 microns.

To this dispersion is added the following positive-acting light-sensitive material:

1.6 parts — o-naphto-quinone diazide (p-tert butyl phenol ester of 2 diazo-1-napthol-5-sulfonic acid)

This dispersion is coated with a No. 10 Meyer Bar onto the corona treated thermoexpansible layer of Example 1 and dried for 5 minutes at 180°F.

The optical density of the resultant sheet measured as per Example 1 is 1.10.

The makeready sheet is exposed through a positive transparency of the desired printed matter to a carbon arc (Grafarc Type 33500-24) for 3 minutes at a distance of 36 inches.

The light-exposed sheet is developed with an aqueous alkaline solution with a PH of approximately 12, whereupon the exposed areas are removed.

Expansion of the developed sheet as outlined in Example 1 yields a similar expanded makeready sheet.

When the positive-acting light-sensitive diazo oxide is replaced by a diazo sulfone, specifically p-toluene sulfone of 4-diazo diphenylamine, similar results are obtained.

What is claimed is:

1. A presensitized, light-sensitive, flexible sheet material of essentially uniform thickness adaptable for makeready in letterpress printing, said sheet material comprising:

a. a flexible carrier web;

b. a selectively thermoexpansible layer at least 2 mils thick overlying said carrier web, comprising an at least temporarily thermosoftenable resinous material, and uniformly distributed therethrough a normally dormant, heat-sensitive puffing agent activatable at a temperature well above room temperature to expand said layer under conditions of heat, said puffing agent being present in an amount sufficient to provide on rapid and complete heat activation of said layer an increase of at least 2 mils in the thickness thereof;

c. a light-sensitive layer overlying said thermoexpansible layer and in direct contact therewith, comprising light-sensitive material having one solubility state in relation to a developing media before exposure to light and another solubility state in relation to said developing media after exposure to light, said light-sensitive material being soluble in one of said states and insoluble in its other state, said layer further comprising a polymeric film-forming binder resin having uniformly distributed therethrough a finely divided pigment, said layer being selectively removable from said underlying thermoexpansible layer in areas wherein said light sensitive material is in its soluble state, said layer being absorptive of high-intensity radiant energy and firmly bonded to said underlying thermoexpansible layer in areas wherein said light-sensitive material is in its insoluble state.

said sheet material in expanded condition being capable of supporting of at least on the order of 250 pounds per square inch for about 15 seconds while maintaining areas of maximum expansion at least approximately 2 mils greater than the initial thickness thereof.

2. The article of claim 1 in which the selectively thermoexpansible layer contains a thermosetting resin.

3. The article of claim 2 in which the selectively thermoexpansible layer contains a curing agent for said thermosetting resin.

4. The article of claim 2 in which the selectively thermoexpansible layer is at least about 3 mils thick and contains an organic plasticizer.

5. The article of claim 1 wherein said light sensitive material comprises one or more photopolymerizable monomers and a photoinitiator capable of forming free radicals when exposed to actinic light.

6. A presensitized, light-sensitive, flexible sheet material of essentially uniform thickness adaptable for makeready in letterpress printing, said sheet material comprising a. a flexible carrier web;

b. a selectively thermoexpansible layer at least 2 mils thick overlying said carrier web, comprising a thermoplastic resin, a thermosetting resin, and a curing agent for said thermosetting resin, and uniformly distributed therethrough a normally dormant, heat-sensitive puffing agent activatable at a temperature well above room temperature to expand said layer under conditions of heat, said puffing agent being present in an amount sufficient to provide on rapid and complete heat activation of said layer an increase of at least 2 mils in the thickness thereof;

c. a light-sensitive layer overlying said thermoexpansible layer and in direct contact therewith, comprising light-sensitive material having one solubility state in relation to a developing media before exposure to light and another solubility state in relation to said developing media after exposure to light, said light-sensitive material being soluble in one of said states and insoluble in its other state, said layer further comprising a polymeric film-forming binder resin having uniformly distributed therethrough a finely divided pigment, said layer being selectively removable from said underlying thermoexpansible layer in areas wherein said light-sensitive material is in its soluble state, said layer being absorptive of high-intensity radiant energy and firmly bonded to said underlying thermoexpansible layer in areas wherein said light-sensitive material is in its insoluble state said sheet material in expanded condition being capable of supporting of at least on the order of 250 pounds per square inch for about 15 seconds while maintaining areas of maximum expansion at least approximately 2 mils greater than the initial thickness thereof.

7. The article of claim 6 wherein said finely divided pigment is carbon black.

8. A process of preparing a makeready sheet suitable for letterpress printing comprising:

a. exposing to actinic light through a photographic negative or positive transparency a light-sensitive flexible sheet material comprising:

a. a flexible carrier web;

b. a selectively thermoexpansible layer at least 2 mils thick overlying said carrier web, comprising an at least temporarily thermosoftenable resinous material, and uniformly distributed therethrough a normally dormant, heat-sentive puffing agent activable at a temperature well above room temperature to expand said layer under conditions of heat, said puffing agent being present in an amount sufficient to provide on rapid and complete heat activation of said layer an increase of at least 2 mils in the thickness thereof;

c. a light-sensitive layer overlying said thermoexpansible layer and in direct contact therewith, comprising light-sensitive material having one solubility state in relation to a developing media before exposure to light and another solubility state in relation to said developing media after exposure to light, said light-sensitive material being soluble in one of said states and insoluble in its other state, said layer further comprising a polymeric film-forming binder resin having uniformly distributed therethrough a finely divided pigment, said layer being selectively removable from said underlying thermoexpansible layer in areas wherein said light-sensitive material is in its soluble state, said layer being absorptive of high-intensity radiant energy and firmly bonded to said underlying thermoexpansible layer in areas wherein said light-sensitive material is in its insoluble state said sheet material in expanded condition being capable of supporting of at least on the order of 250 pounds per square inch for about 15 seconds while maintaining areas of maximum expansion at least approximately 2 mils greater than the initial thickness thereof.

2. selectively developing said light-exposed sheet material in an imagewise manner to remove developable areas of (c);
3. exposing said developed sheet material to uniform high-intensity radiant energy, said radiant energy being differentially absorptive in image areas commensurate with the tonal density of said image areas, said radiant energy providing a heat pattern sufficient to selectively expand said sheet material in accordance with said heat pattern at least 2 mils greater than the initial thickness thereof.

* * * * *

UNITED STATES PATENT OFFICE

CERTIFICATE OF CORRECTION

Patent No. 3,779,761 Dated Dec. 18, 1973

Inventor(s) Daniel S. Dustin

It is certified that error appears in the above-identified patent and that said Letters Patent are hereby corrected as shown below:

Col. 2, line 4 should read "advent" instead of "advant".

Col. 2, line 35 should read "was" instead of "and".

Col. 5, line 19 should read "250 psi" instead of "50 psi".

Signed and sealed this 9th day of April 1974.

(SEAL)
Attest:

EDWARD M. FLETCHER, JR.
Attesting Officer

C. MARSHALL DANN
Commissioner of Patents